Dec. 4, 1962 N. C. PRICE 3,066,890
SUPERSONIC AIRCRAFT
Original Filed Jan. 23, 1953 3 Sheets-Sheet 1
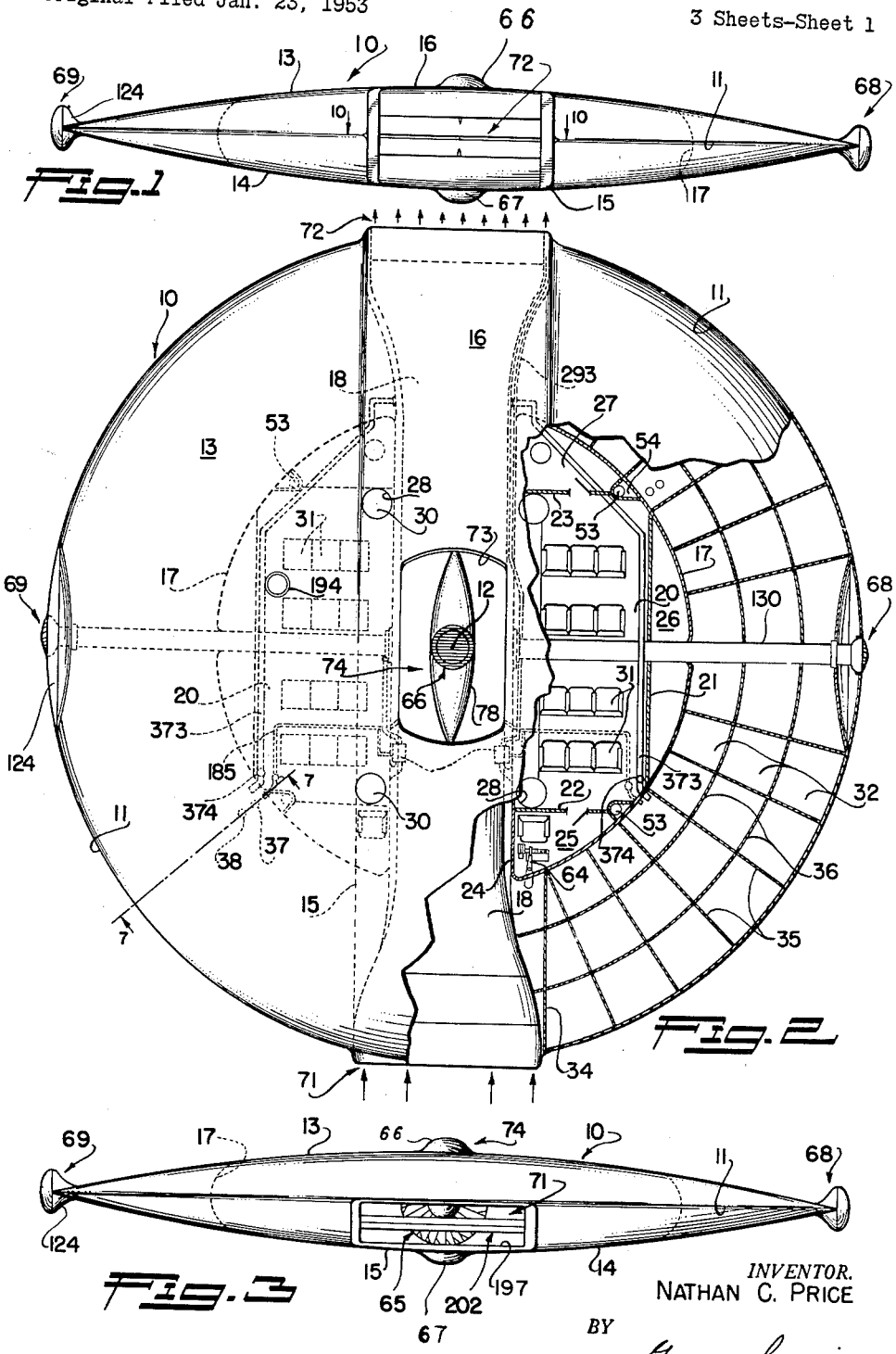
INVENTOR.
NATHAN C. PRICE
BY
George Sullivan
Agent Dec. 4, 1962
N. C. PRICE
3,066,890
SUPERSONIC AIRCRAFT
Original Filed Jan. 23, 1953
3 Sheets-Sheet 2
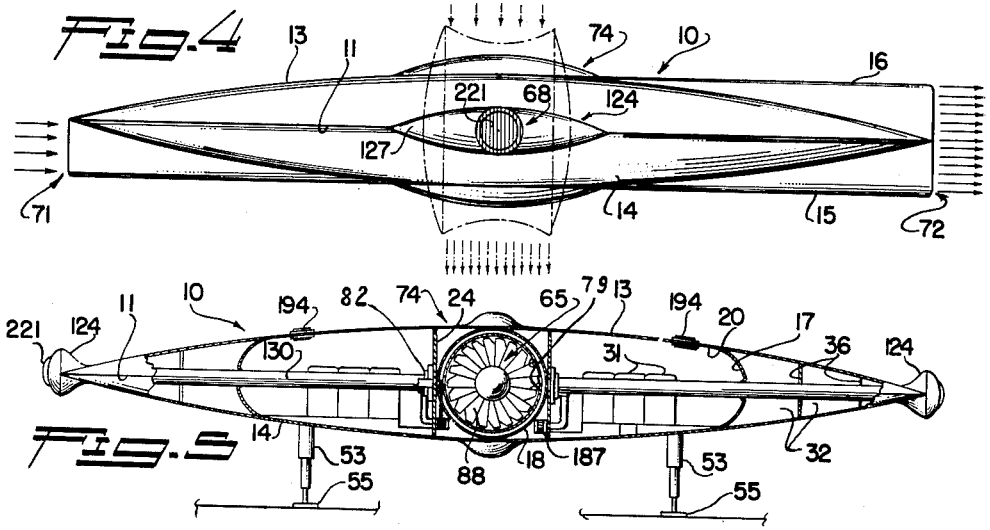
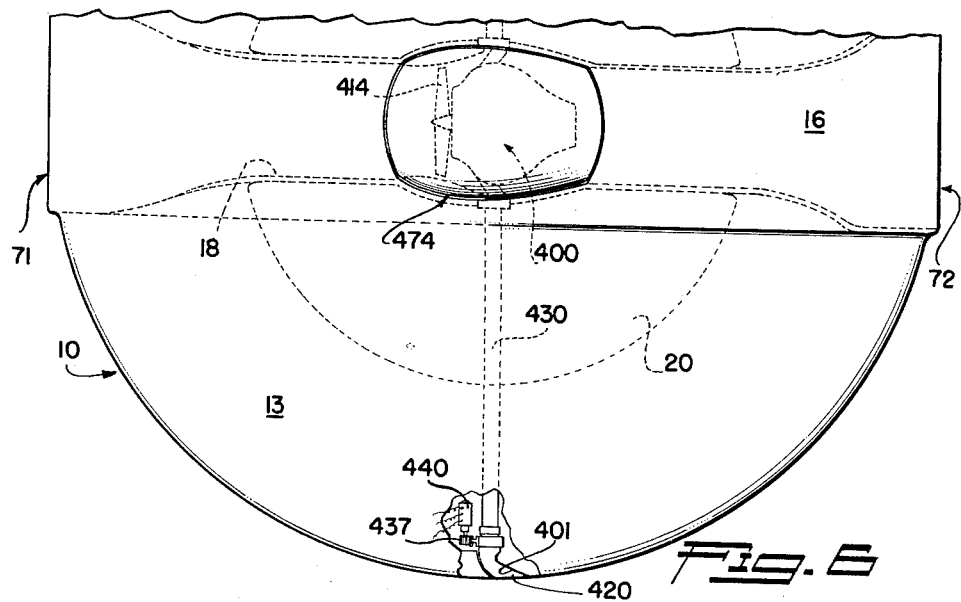
INVENTOR.
NATHAN C. PRICE
BY George C. Sullivan
Agent

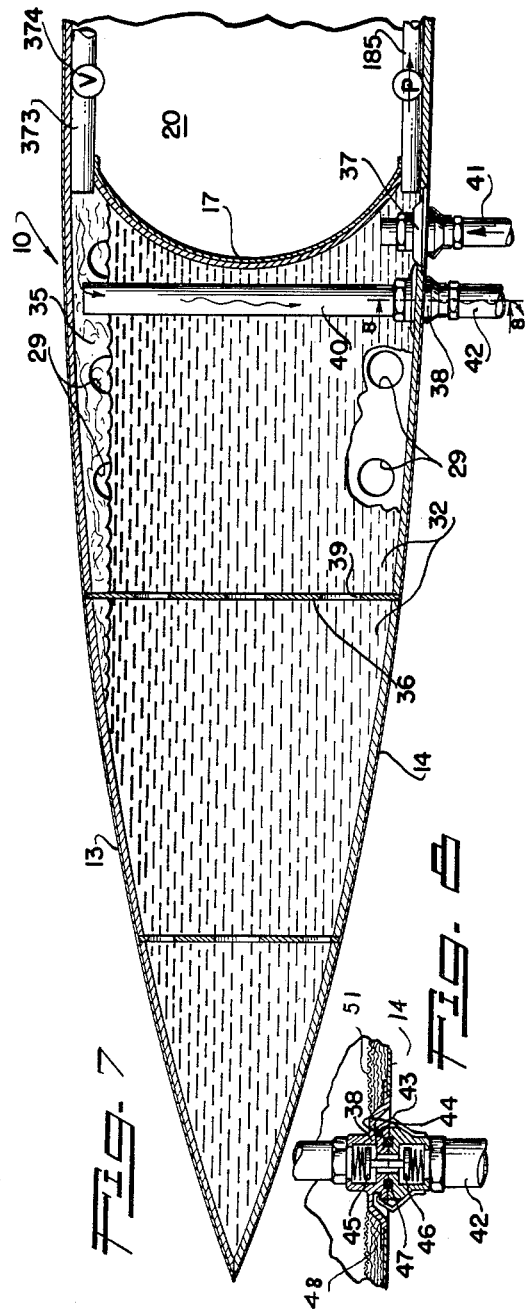

United States Patent Office 3,066,890
Patented Dec. 4, 1962

3,066,890
SUPERSONIC AIRCRAFT
Nathan C. Price, Mexico City, Mexico, assignor to Lockheed Aircraft Corporation, Burbank, Calif.
Original application Jan. 23, 1953, Ser. No. 332,957. Divided and this application July 1, 1957, Ser. No. 669,369
22 Claims. (Cl. 244—15)

This invention relates to aircraft, and relates more particularly to aircraft capable of vertical ascent and descent during takeoff and landing and of high altitude flight at supersonic velocities. It is a general object of this invention to provide vertical rising and descending aircraft characterized by their unique aerodynamically efficient design and by a propelling system for producing safe, efficient, supersonic, long range flight. The aircraft of the invention is designed not only for vertical ascent and descent to facilitate landing and taking off at small fields or landing areas but also for long range flight at a Mach number of, say, 4, and at altitudes in the region of 100,000 ft.

The application is a division of my copending application Serial Number 332,957, filed January 23, 1953, entitled "High Velocity High Altitude Aircraft."

Another object of the invention is to provide aircraft of circular plan-form and of bi-convex vertical cross section which may be devoid of the conventional fuselage, wings, and empennage. The circular plan-form airplane of the invention has spherical has spherical convex upper and lower skin surfaces constituting the major surface areas of the airplane. This simple structure or design has many inherent advantages and features. It:

(1) Is an inherently rigid, strong structure having greater resistance to bending and torsional moments than other airborne configurations;
(2) Provides for a more uniform weight distribution over the lifting surface than other aircraft configurations;
(3) Allows a more uniform distribution of landing forces into the airplane structure and due to its circular plan-form permits the employment of any selected or required number of landing struts;
(4) Is not subject to flutter or to damage by gusts;
(5) Is structurally efficient in containing internal cabin pressures, fuel and other internal loads by reason of the spherical convex upper and lower skin surfaces joined one to the other at the circular periphery of the craft;
(6) Operates to effectively or uniformly distribute the thermal stresses and deformations resulting from high Mach number flight;
(7) Permits the positioning or concentrating of the useful loads in concentric relation to the center of gravity and geometric center of the structure and the disposition of the fuel loads in balanced or concentric relation to the center of gravity and geometric center;
(8) Is stable during vertical ascent and descent due to its circular plan-form;
(9) Provides a maximum volumetric capacity for the pay loads and fuel;
(10) Is simple and inexpensive to construct owing to its simple regular configuration and because many of its parts may be of like or identical size and shape;
(11) Occupies a minimum of field or floor space when not in flight due to its inherent compactness;
(12) Is inherently aerodynamically efficient, having a good L/D ratio and presents a substantially continuous unbroken peripheral edge (leading and trailing edges) and a smooth profile offering a minimum of skin friction drag; and
(13) May land and takeoff from any medium, being stable even on rough water.

These and other considerations and advantages all result from the simple compact circular plan-form airframe of bi-convex cross section.

Another object of the invention is to provide an aircraft of this character having a diametrically extending thin plate airfoil region or portion containing in part the primary propulsive mechanism or means, this thin plate airfoil constituting only a relatively small portion of the total airfoil and yet assisting in producing aerodynamic lift with a minimum of drag.

Another object of the invention is to provide an aircraft of the character above referred to which employs a low boiling point fuel, such as butane or propane as the fuel and refrigerant. Such fuels have approximately 15% more energy value than conventional aircraft fuels but are much less dense, thereby requiring considerably greater tank space or volume. The circular plan-form bi-convex airplane of the invention supplies this necessary fuel storage volume and contains the low boiling point fuel in such a manner that it effectively cools the skin and assists in protecting the passenger and cargo compartments against excessively high temperatures. The low boiling point fuel through vaporization of even only one-third of the total fuel carried absorbs in the neighborhood of 1 million B.t.u. per hour, thereby bringing the skin temperatures into equilibrium at a substantially lower value. Thus the configuration of the airframe or body and the type of propulsive fuel and its mode of storage mutually contribute to the cooling of the skin and provide storage regions of ample volume for the low density fuel.

Another object is to provide aircraft of this kind having a safe dependable propulsive system wherein operational failure of certain of its components will not endanger the craft or its occupants. The load turbines which incorporate the high velocity rotors of the system are so positioned that the planes of rotation of these rotors do not in any instance intersect the passenger compartment or vital portions of the craft while in translational flight. Accordingly, failure or bursting of a rotor will not endanger the occupants of the craft.

Another object of the invention is to provide an aircraft of this kind wherein the variable inlet and the controllable outlet or nozzle of the main duct are generally rectangular and are elongated spanwise of the circular craft to best conform with its thin periphery. The elongated inlet and outlet contribute to the desirable thin central airfoil region and reduce wake losses. The main propulsive duct is diametric of the circular airfoil or body so that there is ample length for the propulsive mechanism in the circumference of the body and therefore no need to extend or project either the ram inlet or the nozzle from the periphery of the circular craft.

A further object is to provide a circular plan-form aircraft as described characterized by the bi-convex skin surfaces capable of carrying substantial internal pressures and by simple yet strong and effective passenger, cargo and fuel compartmentation. The cabin is surrounded by a circular wall or bulkhead extending between the upper and lower convex skin structures, this bulkhead together with the skin structures providing or constituting the fuel tanks or compartments and there are circumferentially spaced radial baffles in the fuel compartments secured to the skins and the circular bulkhead. This internal structure, including, of course, minor local stiffening ribs, etc., is so strong and rigid as to readily withstand all aerodynamically induced vibration forces as well as all other operational loads and forces.

Other objectives and features will become apparent from the following detailed description of typical preferred embodiments of the invention throughout which reference will be made to the accompanying drawings, wherein:

FIGURE 1 is a rear elevational view of an aircraft of the invention;

FIGURE 2 is a plan view of the aircraft with a portion broken away to illustrate the internal structure;

FIGURE 3 is a front elevation of the craft;

FIGURE 4 is an edge or side elevation of the craft with broken lines illustrating the propulsive island in a vertical position to produce vertical thrust for ascent or descent;

FIGURE 5 is a transverse sectional view taken substantially as indicated by line 5—5 on FIGURE 2 and illustrating the landing struts and the tip portions in elevation;

FIGURE 6 is a fragmentary plan view of another aircraft of the invention with a portion broken away to illustrate one of the tip nozzles;

FIGURE 7 is an enlarged fragmentary vertical sectional view taken as indicated by lines 7—7 on FIGURE 2 showing one of the fuel compartments and a portion of the fueling means; and FIGURE 8 is an enlarged fragmentary sectional view taken as indicated by line 8—8 on FIGURE 7.

The aircraft of the invention as illustrated in FIGURES 1 through 5, 7 and 8, includes an airframe, airfoil or body 10, which I will usually hereinafter refer to as the body, of circular plan-form. As best illustrated in FIGURE 2, the body 10 has a periphery 11 which is preferably concentric with an axis 12 which may constitute the center of gravity and the geometric center of the airplane. This periphery 11 is continuous and unbroken except for minor interruptions at the inlet and outlets of the propulsive system, to be subsequently described, and as seen in FIGURES 1, 3, 4 and 5, it is quite sharp to have good aerodynamic characteristics and to minimize the frontal area of the craft. In accordance with the invention the upper and lower surfaces or skins 13 and 14 of the airplane are convex and are preferably spherically convex, being in the nature of two like opposing spheroidal segments having their bases or chords coincident and joining at the plane of the peripheral edge 11. These spherical convex surfaces or skins 13 and 14 are smooth and regular to offer a minimum of drag and join at the circumferential edge 11 (leading and trailing edge) which itself is sharp and aerodynamically efficient. As briefly mentioned above, the body 10 has a diametric airfoil-rear region which is defined by a rather broad yet shallow rib portion 15 extending completely diametrically across the underside of the body 10 and a similar shallow rib portion 16 at the upper side of the body extending from adjacent the center thereof to its trailing edge. The lower side of the lower rib portion 15 is flat and substantially parallel with the plane occupied by the peripheral edge 11 and in a like manner the surface of the upper rib portion 16 is flat and parallel with the same plane. The primary purpose of the rib portion is to provide ample space within the aircraft for elements of the propulsive system, to be later described, although the rib portion constitutes a thin plate airfoil which assists in providing aerodynamic lift for the airplane. In practice, the rib portions 15 and 16 need not be very thick and may die into the contours of the skins 14 and 13 adjacent the center of the craft. The sides or edges of the rib portions 15 and 16, which extend chord-wise of the body 10, are faired into the skins 14 and 13 respectively. However, where the portions 15 and 16 extend fore and aft along the fore and aft axis of the craft, they constitute a rib which serves as a vertical stabilizer for the airplane. The surfaces or skins 13 and 14, the skins of the rib portions 15 and 16, the peripheral edge 11, and other exposed parts of the airplane such as fairings, etc. are preferably constructed of stainless steel or other material capable of retaining adequate strength when subjected to the high temperatures developed during the multi-Mach number flight program.

The airframe 10, as just described, is inherently capable by reason of its geometrical configuration of withstanding heavy stresses and loads and the invention provides a simple yet strong internal structure for reinforcing the airframe and for assuming major structural and functional loads. A pressure bulkhead 17, curved in both plan-form and radial planes is provided in the body 10 and extends between and is secured to the upper and lower skins 13 and 14. The bulkhead 17 is concentric with the axis 12 and may be substantially vertical. A large diametered propulsive air duct 18 extends diametrically through the body 10 and intersects the circular bulkhead 17 to divide the space encircled thereby into two main passenger and/or cargo compartments 20. The duct 18, which will later be described in connection with the propulsive system, extends fore and aft and is coaxial with the rib portions 15 and 16 above described. As the duct 18 interrupts the bulkhead 17 and divides the bulkhead into two sections, there are walls 24 adjacent to and parallel with the duct for connecting the ends of their respective partially circular bulkhead portions. The main compartments 20 which may or may not be interconnecting depending upon the relative diameter of the air duct 18, are shown in the drawings as passenger compartments, being provided with rows of aft facing seats 31. The compartments 20 may, in practice, be defined by portions of the above mentioned walls 24 and by partitions 21, 22 and 23. The bulkheads or partitions 21, 22 and 23, together with the walls 24, define generally rectangular passenger compartments 20 and as the bulkhead 17 is circular, marginal compartments 25, 26 and 27 remain forward, aft and outboard of the main compartments.

The forward compartments 25 may constitute the pilot and crew areas, the outboard compartments 26 may be used to carry luggage, mail, cargo, etc. and the aft compartments 27 may be restrooms or toilets. The various compartments, just described, may be interconnecting. Entrances or hatchways 28 in the upper and lower skins 13 and 14 lead to the main compartments 20 and are equipped with sealed hatches or closures 30 capable of withstanding substantial pressure differentials. The various partitions and walls and particularly the bulkhead 17 and its wall portions 24 may be structural load assuming elements secured to one another and to the skins 13 and 14 to constitute a strong internal assembly or structure.

As briefly noted above, the regions or areas of the circular plan-form bi-convex body 10 around the passenger and load carrying compartments serve as fuel tanks or fuel cells which I have designated 32. The fuel tanks or cells 32 are bounded or defined by the skins 13 and 14, the bulkhead 17 and chord-wise walls or bulkheads 34 extending from the bulkhead 17 to the periphery 11 adjacent and generally parallel to the main air duct 18. I prefer to provide the fuel cells 32 with multiplicities of circumferentially spaced radially disposed internal baffles or bulkheads 35 and spaced circumferential or circular bulkheads 36. These bulkheads 35 and 36 which extend between the skins 13 and 14 and which are attached to the skins materially increase the strength and rigidity of the structure. The bulkheads 35 and 36 are perforated, having openings 29 and 39 respectively (see FIGURE 7), so that the various regions or areas of the individual fuel cells 32 are in communication. It is to be noted that the fuel in the cells 32 is in heat absorbing or heat transfer relation to the major portions of the skins 13 and 14 and the bulkhead 17 and thus serves as a refrigerant to reduce the temperature of the skins and to protect the passenger and cargo compartments 20, 25, 26 and 27 against excessively high temperatures. The cooling or refrigerating action of the fuel and the refrigerating system will be more fully described hereinafter.

Special provision is made to supply or fill the fuel cells 32 with the low pressure fuel. Because butane, propane, and like fuels vaporize readily at normal ground temperatures, it is necessary to continuously withdraw vaporized fuel from the cells or tanks 32 as the cells are filled with liquid fuel and until the craft takes off. For this purpose the lower wall or skin 14 of each fuel cells 32 has two fuel conduits or fittings 37 and 38 (see FIGURE 7 and 8), the fitting 37 serving to discharge liquid fuel into the cell and the fitting 38 being adapted to bleed off fuel vapor from its respective cell. The fittings 38 have stand pipes 40 extending upwardly to adjacent the tops of the cells 32 to receive the fuel vapor. When refueling the airplane and until ascent has been initiated, pipes or hoses 41 are connected with the fittings 37 to supply liquid fuel to the cells and similar hoses 42 are connected with the fittings 38 to draw or carry away the fuel vapor. The fittings 37 and their related hoses 41 and the fittings 38 and their related hoses 42 may have identical detachable connections and valve means and while I will specifically describe the detachable connections and the valve means of the fittings 38 and their pipes or hoses 42, it is to be understood that this description is equally applicable to the corresponding connections and valve means of the fittings 37 and their pipes 41. As shown in FIGURE 8, the hoses or pipes 42 have spring clips 43, or the equivalent, detachably engaged with shoulders 44 on the fittings 38 to hold them in communicating connection with the fittings. Seal rings 47 are engaged between the fittings 38 and the hoses or pipes 42 to prevent the leakage of the vapor or fuel. The fittings 38 and the hoses or pipes 42 have opposing poppet valves 45 and 46, respectively, spring urged to closed positions. The relationship of the valves 45 and 46 is such that so long as the pipes 42 remain coupled with the fittings 38 the valves cooperate with one another to be held in the open positions where the fuel vapor is free to flow out through the hoses or pipes 42. The pipes 42 are connected with an absorption pump (not shown) for drawing away the fuel vapor and the hoses or pipes 42 are connected with a source or sources of the liquid fuel under pressure so as to deliver the liquid fuel to the cells 32 of the airplane. Preparatory to takeoff and so long as the aircraft remains on the ground or field, liquid fuel is pumped in through the hoses or pipes 41 and the vaporized fuel is withdrawn through the hoses or pipes 42. When the aircraft rises vertically from the field or ground, the spring clips 43 snap out of engagement with their shoulders 44 allowing the fittings 37 and 38 to move upwardly out of engagement with their respective pipes 41 and 42. When this occurs the valves 45 and 46 automatically close to retain the liquid fuel and the vaporized fuel within the fuel cells 32 of the airplane and to avoid the spilling or leakage of the fuel from the hoses or pipes 41 and 42.

It is to be observed that the circular plan-form bi-convex aircraft body 10 provided with the partly circular fuel cells 32 has a large aggregate volumetric fuel storage capacity. This well adapts the craft for the utilization of butane or propane which have approximately 15% greater energy value than conventional aircraft fuels on a weight basis but are far less dense and, therefore, require large capacity storage space for comparable ranges of flight. By making the bulkhead 17 of less diameter the fuel capacity of the cells 32 may be greatly increased to extend the operational range of the craft. This is indicated and practical in the case of military craft where the personnel and the payload areas or compartments may be quite small. Furthermore, for military craft it may be desirable to use liquid hydrogen as the propulsive fuel to materially extend the operational range. Liquid hydrogen has a very low density (.086) with a boiling point density of 0.070 and on a volume per heat content basis requires approximately three times as much space as gasoline. However, for pilotless military aircraft and military aircraft carrying one or two men, the body 10 is such that it may be readily compartmented to contain ample liquid hydrogen as its fuel for a non-stop flight of, say, 7,500 miles. Such liquid hydrogen could well be supplied to or pumped into the fuel cells 32 in the same manner as the other fuels.

The lower boiling points fuels are especially well adapted for cooling the passenger and payload compartments and other critical regions of the aircraft and greatly reduce the temperature of the skin. Butane has a boiling point under 33° F. and propane has a boiling point of —45° F. Such fuels and the vapor therefrom in contact with the inner surfaces of the skins 13 and 14 prevent the skins from being excessively heated by the aerodynamically induced heat. Assuming the body 10 has a diameter of 50 ft. and that the craft is operated at a speed of Mach number 4 at an altitude of 100,000 ft. it is calculated that the temperature of the skins unless provision is made for cooling it, would reach 1139° F. However, the skins 13 and 14 preferably has their outer surfaces chemically oxidized black, or otherwise treated, or coated to have a heat emissivity of approximately 0.95. This high emissivity will result in radiation of a substantial amount of heat energy into space. Although the emissivity of a surface is numerically equal to its absorptivity there is a distinct and novel advantage in providing the skins 13 and 14 of the airplane of this invention with external surfaces having high emissivity. The heat input to the skins 13 and 14 as a result of the frictional drag and the airplane speed is considerable. On the other hand, solar radiation will tend to increase the skin temperature to only a very minor extent. It is estimated that the aerodynamically induced heat input to the skin will be approximately thirty times as much as the heat induced by solar radiation. Accordingly, the skin surfaces of high emissivity and correspondingly high absorptivity have the net effect of emitting many times as much heat energy as they are capable of absorbing and the surfaces of high emissivity function as effective heat dissipating elements of the cooling or refrigerating means of the invention. Additionally, the heat energy required to vaporize approximately 30% of the low boiling point fuel during the flight program is substantial, being in the neighborhood of 1 million B.t.u. per hour under the above assumed conditions. Thus it is calculated that the skin temperatures under the above conditions will come into equilibrium at about 940° F. The stainless steel skins 14 and 13 maintain their structural integrity at such a temperature and the internal structure adjacent thereto is not adversely affected at such a temperature. The material reduction in the temperature of the skins of the aircraft has the effect of increasing the efficiency and range of the craft. The reduction in skin temperature proportionately reduces the viscosity of the boundary layer air and therefore increases the aerodynamic efficiency of the circular plan-form biconvex airfoil or craft.

The invention provides effective thermal insulation at the inner surfaces of the skins 13 and 14 at the bulkheads 17, walls 24, bulkheads 34, and other walls, bulkheads, etc. where necessary or desirable to thermally insulate the internal structure and the passenger and payload areas of the aircraft, it being observed that the fuel cells 32 containing the low boiling point fuel and its vapor substantially surround the passenger and payload compartments 20, 25, 26 and 27. The fuel cells 32 and their contents thus form effective thermal barriers protecting the passenger and payload regions. FIGURE 8 shows a form of insulation that may be used on the skins 13 and 14 and the several bulkheads, walls, etc. The insulation, as illustrated, is provided on the inner surface of the skin 14, is being understood that it is equally applicable to the other insulated areas and regions. The insulation includes "Alfoil" blankets 48 which are comprised of pluralities of corrugated or crinkled aluminum or other metal foil sheets arranged and related so that there are multiplicities of air spaces between the adjacent foil sheets. Such insulation has a very low apparent density and a low $k$ factor and is therefore well adapted for this application. However, other appropriate thermal insulation or insulating materials may be use if desired. The blankets 48 of metal foil are engaged on or fixed to the inner side of the skin 14. In order to retain the rather loosely arranged blankets 48, I provide metal mesh, screens or the like, 51 to extend across the blankets 48. Immersion of this type of insulation, either temporarily or permanently, in the fuel and/or fuel vapor of the cells 32 does not impair the insulating qualities although it may alter the $k$ factor while the insulation is immersed, depending upon the proportion of fuel vapor between the layers. The foil of the insulating blankets 48 is preferably polished or bright to be most efficient in reflecting radiant energy under practically all conditions.

In accordance with the broader aspects of my invention any suitable or selected type of alighting or landing gear may be employed. In the drawings, and more particularly in FIGURES 2 and 5, I have shown a plurality of spaced generally vertical shock absorbing struts 53 projectable from the underside of the body 10. The retractable struts 53 may be of the oleo type and are preferably arranged for vertical retraction into relatively small spaces or compartments 54 at the bulkhead 17 and adjacent the adjoining corners of the above described compartments 20, 26 and 27. In this connection it is to be observed that the landing gear struts 53 may be readily be anchored or attached to the body 10 at regions where the landing loads may be transmitted directly to the strong rigid internal structure of the craft and that by reason of the circular configuration of the body 10 and the circular arrangement of its bulkhead 17 and other structural parts any selected or required number of the struts 53 may be installed in practically any required pattern or relationship. The lower ends of the landing struts 53 may be equipped with wheels, pads, or the like. In the drawings I have shown pads 55 on the struts 53 of such a nature that they may lie substantially flush with the surfaces of the lower skin 14, when the struts are retracted, so as to offer little or no aerodynamic drag.

It is contemplated that translational flight will usually be at such great altitude that visual observation by the passengers will be of minor consequence and there is no real necessity for the provision of windows, or the like, in the passenger compartment 20. It is also contemplated that the flight of the craft will be controlled by a remotely controlled automatic pilot means thus reducing the flight personnel to a minimum. However, to facilitate pilot controlled landings, maneuvers during emergencies, etc. either one or both of the pilot compartments 25 is provided with a periscope 64, shown in a general way in FIGURE 2.

The propulsive system of the aircraft illustrated in FIGURES 1 to 5 inclusive may be said to comprise, generally, a ducted compressor 65 capable of angular adjustment or movement to produce vertical lift and translational propulsion, upper and lower load turbo powerplants 66 and 67 for driving the compressor 65 and for producing propulsive and directional thrust, a variable ram or air inlet 71 for the ducted compressor 65 and ram jet means 70, a variable area and directional outlet or propulsive nozzle 72 for the ducted compressor and ram jet means, and various other parts and mechanisms associated with these primary propulsive elements.

The ducted compressor 65 is preferably located at or adjacent the geometric center of the circular planform airframe or body 10 and is pivotally mounted to be movable about a spanwise and preferably diametric axis so as to be turned to a vertical or generally vertical position during the vertical ascent and descent of the craft and to be brought to a position coaxial with the abovementioned fore and aft duct 18 and during translational flight of the craft. The main air duct 18 extends diametrically through the circular body 10, as above described, and is provided at its forward end with the variable area inlet 71 and at its aft end with the variable area and directional nozzle 72. The major portion of the duct 18 is preferably cylindrical although its end portions are horizontally elongated, as will be more fully described in connection with the inlet 71 and the outlet or nozzle 72. The airframe or body 10 has a central vertical opening 73 which intersects the duct 18 and the propulsive compressor 65 is housed or carried in a structure 74 which I will term an "island." This island 74 is journaled at the vertical opening 73 to be movable or turnable therein about a horizontal spanwise axis. The island 74 may be a generally rectangular structure to fit between the walls 24 of the compartments 20 with suitable clearance, and has upper and lower walls which are generally flush with the upper and lower sides of the rib portions 15 and 16 of the body 10 when the island is in the horizontal position. The island 74 is tubular or provided with a through duct 79 to register with, and in effect form a part of, the propulsive duct 18 when the island is in the generally horizontal position.

The island 74 is supported for angular movement about the spanwise axis on tubular trunnions 82 projecting from the opposite sides of the island and journaled on the walls 24. The trunnions 82 are tubular for the reasons to be later described. The ducted compressor 65 is of the supersonic class insofar as the relative velocity of entrained air against the blading is concerned and carries a row of supersonic blades 88. The supersonic compressor 65 is adjacent and slightly forward of the axis of angular movement of the island 74 and the geometric center of the airframe or body 10.

In order to facilitate a better understanding of the invention the following data is given of a typical installation or embodiment wherein the airframe or body 10 is assumed to be 50 ft. in diameter and the craft is assumed to have a gross loaded weight of about 55,000 pounds. In such a case the diameter of the ducted compressor 65 will be 6 ft. and the speed of rotation of the compression rotor will not exceed 3700 r.p.m., which is equivalent to the comparatively conservative top speed of 1200 feet per second, precluding the possibility of the rotor bursting. The compression ratio of the ducted compressor 65 will be 1.89 to 1 and the total weight flow of air through the ducts will be 770 pounds per second. It is to be understood that these figures are merely illustrative and, of course, will vary in different applications and aircraft.

The load turbo powerplants 66 and 67 serve to assist in driving or rotating the ducted compressor 65 and themselves produce propulsive gas streams or jets. The powerplants 66 and 67 are provided or arranged at a vertical axis which intersects the axis of rotation of the ducted compressor at or adjacent the geometric center 12 of the craft. The powerplants 66 and 67 are carried by the island 74 and are arranged on the upper and lower sides respectively of the island, assuming the island to be in the full line position illustrated throughout the drawings. The powerplants 66 and 67 are supercharged by the ducted compressor 65 and serve to drive the compressor through a transmission means as described in my application Serial Number 332,957, identified above, which describes and claims the propulsive system or means of the airplane including the island 74, the propulsive means carried by the island, the means for moving the island between the full line and broken line positions of FIGURES 4 and 5, the fuel supply and burner means and the other elements of the overall propulsion system.

The tip or outboard powerplants 68 and 69, which are fully described in my application Serial Number 332,957, are provided to assist in driving the ducted compressor 65, to produce propulsive jets, and they are controllable to provide for or to assist in the steering or directional control of the craft. The turbo jet load powerplants 68 and 69 are positioned on the periphery of the circular plan-form airframe or body 10 on a common diametric axis which intersects the axis of rotation of the ducted compressor 65 and the longitudinal axis of the ducts 18 and 79 at or adjacent the geometric center 12 of the body 10. In the aircraft illustrated where the periphery of the body 10 is sharp or thin, I provide streamlined enlargements or pods 124 at the outboard edges or "tips" of the body to contain the powerplants 68 and 69 and their auxiliaries and controls. These pods 124 may be designed or shaped to reduce the vortices losses at the margins or tips of the craft.

Like the inboard load powerplants 66 and 67, the outboard or tip turbo powerplants 68 and 69 are supercharged by the ducted compressor 65, receiving compressed air from the compressor and further compressing it before it reaches their respective combustion zones. Tunnels or tubes 130 of substantial capacity which extend radially outward through the compartments 20 and 21 and the fuel cells 32 conduct the compressed air from the compressor to the outboard powerplants 68 and 69. The powerplants 68 and 69 are carried for angular movement about a spanwise or diametric axis which intersects the fore and aft axis of the body 10 at the geometric center 12 of the body. The tip or outboard turbo load powerplants 68 and 69 are drivingly connected with the ducted compressor by shafts (not shown) extending outwardly through the tubes 130 and drivingly connected with the compressor by a transmission means.

The load turbo powerplants 66, 67, 68 and 69 are arranged and located in such a fashion that explosion or bursting of any of them during flight will not endanger the occupants or any critical portions of the craft, the rotors of the powerplants 66 and 67 being arranged to rotate in planes parallel with and spaced above and below the airframe proper and remote from the passenger compartments and fuel cells 32 and the rotors of the outboard load powerplants 68 and 69 being arranged to rotate in planes far remote from and parallel with the side walls 24 of the occupied compartments and outboard from the fuel cells 32 and the periphery of the airframe.

As mentioned above, the island 74 carrying the ducted compressor 65 is pivotally movable about the spanwise axis of the airframe or body 10 between the position when its air duct 79 is aligned with and in register with the main air duct 18 of the body 10 for translational flight and the position where the island duct 79 is vertical or substantially normal to the duct 18 for generally vertical takeoff and landing.

The present specification is not primarily concerned with the details of the propulsive system such as the means for moving the island 74, the controls and fuel systems for the powerplants 66, 67, 68 and 69, the fuel injector or combustor means for introducing fuel downstream from the compressor 65, the means for controlling or directing the jet streams from the powerplants 68 and 69, and like features, since these and the other elements of the propulsive system are fully described in my copending application Serial Number 332,957. However, it may be noted that fuel or fuel vapor is led from the upper portions of the fuel cells by pipes 373 for consumption by the propulsive system. These pipes 373, which are controlled by valves 374, extend along the walls of the passenger compartments 20 so that the fuel vapor assists in refrigerating the compartments. Other pipes 185, lead from the lower portions of the fuel cells to the propulsive system or propulsive components.

The inlet 71 of the main propulsive air duct 18 is in the nature of a supersonic variable ram inlet. The forward or inlet end portion of the duct 18 is elongated in the spanwise direction, the forward portion of the duct flaring forwardly and spanwise while at the same time being reduced in its vertical dimension to terminate at a rectangular forward opening 197, see FIGURES 2 and 3. The opening 197 is in the lower rib portion 15 being below the periphery 11 of the body 10, and has generally straight horizontal and vertical margins at its forward terminus. It should be noted that the elongate entrance of the opening 97 conforms generally with the thin forward edge or periphery of the body 10 to keep the frontal area of the craft at a minimum. The ram inlet 71 is of variable area, having an island 202 of variable volume or variable cross section. The main propulsive jet nozzle 72 at the aft end of the main duct 18 automatically changes from a subsonic nozzle to a supersonic nozzle and vice versa in accordance with the flow conditions of the discharging air and gas jet, incorporates variable direction features to obtain pitching trim, and is operable as an air brake to reduce the velocity of flight under certain conditions. The variable area inlet 71 and the variable propulsive nozzle 72 are more fully described in my copending application Serial Number 332,957, identified above.

FIGURE 6 illustrates another aircraft of the invention characterized by turbo-propeller powerplant 400 serving as the primary propulsive means. In this aircraft the body 10, the duct 18, the ram inlet 71, the propulsive nozzle 72, and the various other parts may be the same as in the above described embodiment of the invention. The central island 474 is substantially the same as the island 74, however, it is shaped and proportioned to contain the powerplant 400. The island 474 is arranged to be turned or pivoted on the spanwise axis of the body 10 and the trunnions or means for pivotally supporting the island also serve to supply compressed air from the powerplant to lateral ducts 430 which carry the air outboard to directional nozzles 420. These nozzles 420, which are movable in curved slots 401 in the periphery of the body 10, are rotated or pivoted by reversible electric motors 440 acting through suitable rack and pinion means 437 associated with the nozzles. The powerplant 400 may be of the type disclosed in my earlier Patents 2,563,270 issued August 7, 1951, and 2,575,682 issued November 20, 1951. The powerplant 400 has a propeller or compressor means 414 in the tubular island 474 and is a turbo-powerplant serving to drive the compressor means and to discharge a propulsive jet rearwardly through the duct 18. The propeller or compressor means 414 serves to compress air in the duct system to supercharge the turbo engine and to increase the pressure of the air discharging through the duct 18 and nozzle 72. The rammed air in the duct 18 supercharged or further compressed by the compressor 414 is also directed to the directional propulsive nozzles 420 at the periphery of the body 10. For vertical ascent and descent of the aircraft the island 474 is swung to a vertical position where it discharges the propulsive jet downwardly and the outboard nozzles 420 are likewise turned to face downwardly to produce upward or lifting thrusts. For translational flight the island 474 is brought to the horizontal or normal position where its propulsive jet stream flows aft through the main propulsive duct and the outboard nozzles 420 are also turned to face aft to provide additional forward thrust although these nozzles may be simultaneously and/or differentially adjusted or controlled to assist in directional control of the aircraft.

It is believed that the operation and features of the aircraft of this invention will be apparent from the foregoing description. It will be seen that the circular planform-bi-convex aircraft body 10 is a rigid, strong structure particularly resistant to bending and torsional loads. The body 10 being circular permits substantially uniform weight distribution over its lifting surfaces and a good distribution of landing forces. The spherical convex upper and lower surfaces 13 and 14 joined at the circular leading-trailing edge 11 are especially structurally efficient in carrying the internal loads, the cabin air pressures, and the body 10 being circular allows for the disposition of the useful loads and fuel loads in concentric or balanced relation to the C.G. and geometrical center of the structure. Since the aircraft is devoid of wings, and empennage, etc. and since it has a simple regular configuration so that many of its parts may be similar or identical in size and shape, the body 10 and the overall aircraft is inexpensive to manufacture and maintain. The aircraft is aerodynamically efficient, having an excellent $L/D$ ratio and because it presents a substantially continuous unbroken peripheral edge 11 and a smooth profile, it offers a minimum of skin friction drag. The portions 15 and 16 extending diametrically fore and aft provide a rib which serves as a vertical stabilizer and define a region which contains the main propulsive elements of the aircraft. This diametric fore and aft thin plate airfoil region has the added function of assisting in producing aerodynamic lift with a minimum of drag. It will be observed that the elements of the propulsive system are arranged or located so that their high velocity rotating members will not endanger either the aircraft or its occupants in the event of operational failure. The internal compartmentation of the circular plan-form aircraft, as above described, provides for effective protected passenger compartments as well as extensive cargo and fuel cells or spaces. The circular bulkhead 17, together with the spaced radial dividers or baffles of the outer compartments or fuel compartments are secured together and to the upper and lower skins 13 and 14 to constitute a strong rigid airframe.

Having described only typical forms of the invention I do not wish to be limited to the specific details herein set forth, but wish to reserve to myself any variations or modifications that may appear to those skilled in the art and fall within the scope of the following claims.

I claim:

1. In an aircraft; an aircraft body of circular plan-form having convex spheroidal upper and lower sides and including a fore and aft relatively flat airfoil section substantially diametric and parallel to the direction of horizontal flight.

2. In an aircraft the combination of; an aircraft body of circular plan-form and including a convex spheroidal upper skin, a lower skin, the body having a fore and aft duct substantially diametric and parallel to the direction of horizontal flight extending therethrough, and propulsive means in the duct for propelling the aircraft.

3. In an aircraft the combination of; an aircraft body of circular plan-form and including a convex spheroidal upper skin, a lower skin, the body having a fore and aft propulsive jet duct substantially diametric and parallel to the direction of horizontal flight extending therethrough, propulsive means in the duct, and means carried by the body external of the duct for driving the propulsive means.

4. In an aircraft the combination of; an aircraft body of substantially circular plan-form including a convex upper skin, a lower skin, and a substantially circular marginal edge connecting the skins, fuel consuming propulsion means in the body, circular bulkhead means in the body substantially concentric with said edge and spaced therefrom, the bulkhead means extending between the upper and lower skins and together with the skins defining cells for containing fuel for the propulsion means, said cells being at the outer side of the bulkhead means, and pay load compartments within the circular bulkhead means.

5. In an aircraft the combination of; an aircraft body of substantially circular plan-form including a convex upper skin, a lower skin, and a substantially circular marginal edge connecting the skins, fuel consuming propulsion means in the body, circular bulkhead means in the body substantially concentric with said edge and spaced therefrom, the bulkhead means extending between the upper and lower skins and together with the skins defining cells for containing fuel for the propulsion means, said cells being at the outer side of the bulkhead means, and pay load compartment means defined by the two skins and the inner side of the circular bulkhead means.

6. In an aircraft having fuel consuming propulsion means the combination of; an aircraft body of substantially circular plan-form carrying the propulsion means and including a convex generally spheroidal upper skin, a lower skin, and a substantially circular marginal edge connecting the skins, circular bulkhead means in the body substantially concentric with said edge and spaced therefrom, the bulkhead means extending between the upper and lower skins and together with the skins defining cells for containing fuel for the propulsion means, and spaced reinforcing bulkheads in the cells substantially concentric with said edge and connecting the upper and lower skins.

7. In an aircraft having fuel consuming propulsion means the combination of; an aircraft body of substantially circular plan-form carrying the propulsion means and including upper and lower skins, and a substantially circular marginal edge connecting the skins, circular bulkhead means in the body substantially concentric with said edge and spaced therefrom, the bulkhead means extending between the upper and lower skins and together with the skins defining cells for containing fuel for the propulsion means, said cells being at the outer side of the bulkhead means, and circumferentially spaced bulkheads in the cells extending substantially radially with respect to the axis of curvature of said edge and secured to the upper and lower skins to strengthen the body.

8. In an aircraft having fuel consuming propulsion means the combination of; an aircraft body of substantially circular plan-form carrying the propulsion means and including upper and lower skins, and a substantially circular marginal edge connecting the skins, circular bulkhead means in the body substantially concentric with said edge and spaced therefrom, the bulkhead means extending between the upper and lower skins and together with the skins defining cells for containing fuel for the propulsion means, said cells being at the outer side of the bulkhead means, spaced bulkheads in the cells curved substantially concentric with the axis of curvature of said edge, and spaced bulkheads in the cells extending radially with respect to said axis, the first and second mentioned bulkheads being secured to the skins to strengthen the body.

9. In an aircraft having propulsive means; an aircraft body of circular plan-form and having convex generally spheroidal upper and lower sides, the body including a diametric portion extending fore and aft and presenting generally flat upper and lower external surfaces to constitute a flat airfoil, said diametric portion containing said propulsive means.

10. In an aircraft; an aircraft body of circular plan-form and having convex spheroidal upper and lower sides, the body including a portion extending fore and aft and presenting generally flat upper and lower external surfaces to constitute a flat airfoil, and a propulsive air duct system extending through said portion from the forward end to the aft end of the body.

11. In an aircraft having propulsive means producing a propulsive air stream; an aircraft body of circular plan-form and having convex spheroidal upper and lower sides, the body including a diametric portion extending fore and aft and presenting generally flat upper and lower external surfaces to constitute a flat airfoil, an air duct extending through said portion from the forward end to the aft end of the body to carry said propulsive airstream, and a propulsive nozzle at the aft end of the duct for discharging the stream as a propulsive jet.

12. In an aircraft; an aircraft body of circular plan-form and having convex spheroidal upper and lower sides, the body including a diametric portion extending fore and aft and presenting generally flat upper and lower external surfaces to constitute a flat airfoil, an air duct extending through said portion from the forward end to the aft end of the body, a horizontally elongated ram inlet at the forward end of the duct, means for propelling an air stream aft through the duct, and a horizontally elongated propulsive discharge nozzle at the aft end of the duct.

13. In an aircraft the combination of; an aircraft body of circular plan-form having a convex upper side and a lower side, a duct extending fore and aft through the body from its leading edge to its trailing edge, a variable area ram inlet at the forward end of the duct, a variable area propulsive nozzle at the aft end of the duct, and propulsive means in the duct operable to further compress the ram-compressed air flowing aft through the duct.

14. In an aircraft the combination of; an aircraft body of circular plan-form having a convex upper side, a lower side, a duct extending fore and aft through the body from its leading edge to its trailing edge, a variable area ram inlet at the forward end of the duct, a variable area propulsive nozzle at the aft end of the duct, and powerplant means in the duct for adding propulsive energy to the ram-compressed air flowing aft through the duct.

15. In an aircraft the combination of; an aircraft body of circular plan-form having a convex upper side, a lower side, and a straight through duct extending fore and aft through the body from its leading edge to its trailing edge having a variable area propulsive nozzle at its aft end.

16. In an aircraft the combination of; an aircraft body of circular plan-form having a convex upper side, a lower side, a duct extending fore and aft through the body from its leading edge to its trailing edge, a variable area ram inlet at the forward end of the duct, a variable area propulsive nozzle at the aft end of the duct, compressor means operable in the duct to further compress the ram-compressed air flowing therethrough, and turbo-jet engines on the body spaced outboard from the duct for driving the compressor means.

17. In an aircraft the combination of; an aircraft body of circular plan-form having a convex upper side, a lower side, a duct extending fore and aft through the body from its leading edge to its trailing edge, a variable ram inlet at the forward end of the duct, compressor means operable in the duct to further compress the ram-compressed air flowing therethrough, and turbo-jet powerplants on the body above and below the duct for driving the compressor means.

18. In an aircraft the combination of; an aircraft body of circular plan-form having upper and lower sides, a duct extending fore and aft through the body from its leading edge to its trailing edge, a variable area ram inlet at the forward end of the duct, a variable area propulsive nozzle at the aft end of the duct, means operable in the duct to further compress the ram-compressed air flowing therethrough, and engines on the outboard margins of the circular body for driving said means.

19. In an aircraft; an aircraft body of circular plan-form having convex upper and lower skins, a propulsive air duct extending fore and aft through the medial region of the body having a ram inlet at its forward end and a propulsive nozzle at its aft end, a circular bulkhead in the body extending between and connected with the skins to reinforce the body, the bulkhead defining the outer walls of central region passenger compartments, there being storage compartments in the body between its periphery and the bulkhead.

20. An aircraft including an aircraft body of substantially circular plan-form and having upper and lower sides, bulkhead means in the body curved about the central vertical axis of the body and extending between its upper and lower sides, passenger and payload compartments within the bulkhead means, a propulsive ram air duct extending fore and aft through the body having a ram inlet at its forward end and a propulsive nozzle at its aft end, a relatively low velocity propulsive means operable in the duct, and powerplants in the body spaced above and below the duct for driving the propulsive means, said powerplants being in planes spaced above and below the plane of said compartments.

21. In an aircraft; an aircraft body of circular plan-form having upper and lower skins, a propulsive air duct extending fore and aft through the medial region of the body having a ram inlet at its forward end and a propulsive nozzle at its aft end, and a circular bulkhead in the body extending between and connected with the skins to reinforce the body, the bulkhead defining the outer walls of central region passenger compartments, there being storage compartments in the body between its periphery and the bulkhead, the bulkhead being arcuate in vertical cross section and arranged with its convex side facing toward the periphery of the circular body.

22. In an aircraft the combination of; an aircraft body of substantially circular plan-form having convex upper and lower surfaces, bulkhead means in the body defining large volume storage compartments in the major peripheral regions of the body for containing low boiling point fuel and also defining passenger compartments in the central region of the body encircled by the storage compartments to be protected against aerodynamically induced high temperatures by the stored fuel, and a propulsive system for propelling the craft consuming said fuel.

References Cited in the file of this patent

UNITED STATES PATENTS

| | | |
|---|---|---|
| 1,585,281 | Craddock | May 18, 1926 |
| 1,957,896 | Marguglio | May 8, 1934 |
| 2,377,835 | Weygers | June 5, 1945 |
| 2,384,893 | Crook | Sept. 18, 1945 |
| 2,397,184 | Klose | Mar. 26, 1948 |
| 2,563,270 | Price | Aug. 7, 1951 |
| 2,567,392 | Naught | Sept. 11, 1951 |
| 2,575,682 | Price | Nov. 20, 1951 |
| 2,619,302 | Loedding | Nov. 25, 1952 |
| 2,718,364 | Crabtree | Sept. 20, 1955 |
| 2,726,671 | Zand et al. | Dec. 13, 1955 |
| 2,730,311 | Doak | Jan. 10, 1956 |
| 2,772,057 | Fischer | Nov. 27, 1956 |
| 2,807,428 | Wibault | Sept. 24, 1957 |

FOREIGN PATENTS

| | | |
|---|---|---|
| 1,047,657 | France | Apr. 19, 1950 |
| 547,021 | Italy | Aug. 6, 1956 |
| 50,033 | France | Aug. 1, 1939 |
| | (Addition to 799,655) | |

OTHER REFERENCES

Western Aviation Magazine, September 1956, pages 9 and 10.